(12) United States Patent
Glauser et al.

(10) Patent No.: US 7,930,073 B2
(45) Date of Patent: Apr. 19, 2011

(54) METHOD AND SYSTEM FOR CONTROLLING AIRFOIL ACTUATORS

(75) Inventors: Mark Glauser, Manlius, NY (US); Hiroshi Higuchi, Fayetteville, NY (US)

(73) Assignee: Syracuse University, Syracuse, NY (US)

( * ) Notice: Subject to any disclaimer, the term of this patent is extended or adjusted under 35 U.S.C. 154(b) by 722 days.

(21) Appl. No.: 11/159,682

(22) Filed: Jun. 23, 2005

(65) Prior Publication Data

US 2006/0266106 A1    Nov. 30, 2006

Related U.S. Application Data

(60) Provisional application No. 60/582,113, filed on Jun. 23, 2004.

(51) Int. Cl.
*G05D 1/08* (2006.01)

(52) U.S. Cl. ............................................. 701/7; 701/10

(58) Field of Classification Search ................ 701/7, 10; 244/203; 73/147
See application file for complete search history.

(56) References Cited

U.S. PATENT DOCUMENTS

| | | | | |
|---|---|---|---|---|
| 4,080,922 | A * | 3/1978 | Brubaker | 114/282 |
| 5,215,015 | A * | 6/1993 | Iida et al. | 104/23.1 |
| 5,354,178 | A * | 10/1994 | Ferleger et al. | 416/223 A |
| 5,740,991 | A * | 4/1998 | Gleine et al. | 244/203 |
| 5,796,612 | A * | 8/1998 | Palmer | 701/4 |
| 5,875,998 | A * | 3/1999 | Gleine et al. | 244/195 |
| 6,002,972 | A * | 12/1999 | Palmer | 701/4 |
| 6,253,126 | B1 * | 6/2001 | Palmer | 701/14 |
| 6,412,732 | B1 * | 7/2002 | Amitay et al. | 244/208 |
| 6,735,036 | B1 * | 5/2004 | Olim | 360/75 |
| 6,837,757 | B2 * | 1/2005 | Van Dine et al. | 440/6 |
| 2001/0056316 | A1 * | 12/2001 | Johnson et al. | 701/14 |
| 2002/0040948 | A1 * | 4/2002 | Ragner | 244/153 R |
| 2005/0106016 | A1 * | 5/2005 | Segota et al. | 416/1 |
| 2005/0106017 | A1 * | 5/2005 | Segota et al. | 416/1 |

OTHER PUBLICATIONS

Glauser, M, Young, M, Higuchi, H., Tinney, C. and Carlson, H. POD Based Experimental Flow Control on a NACA-4412 Airfoil (Invited ), 42nd AIAA Aerospace Sciences Meeting and Exhibit—AIAA 2004-0575.*
Taylor, J. A. and Glauser, M. N., 2002, "Towards Practical Flow Sensing and Control via POD and LSE Based Low-Dimensional Tools," J. Fluids Eng.—May 2004—vol. 126, Issue 3, 337.*
R. Schmidt, M. Glauser, Improvements in low dimensional tools for flow-structure interaction problems: using global POD, AIAA Papers 2004-0889.*
Low-dimensional models of coherent structures in turbulence by: Holmes et al.; Physics Reports, vol. 287, No. 4. (Aug. 1997), pp. 337-384.*

\* cited by examiner

*Primary Examiner* — Khoi Tran
*Assistant Examiner* — Jorge O Peche
(74) *Attorney, Agent, or Firm* — David L. Nocilly; George R. McGuire; Bond Schoeneck & King, PLLC

(57) ABSTRACT

A method of measuring the state of flow above an airfoil using an estimation of the velocity field based on a combination of Particle Image Velocimetry PIV and multiple surface pressure measurements processed through a POD/mLSE algorithm. Integral to the POD/mLSE algorithm is the estimation of the global POD coefficients. The utility of these time dependent coefficients, which are estimated from surface pressure only, are demonstrated in a simple proportional feedback loop (as the time series to drive the actuators) to keep the flow attached. This method requires realistic feedback flow control since surface measurements and not inflow measurements are required for practical applications. The estimation method works well with dynamic strain on flexible bodies and is not limited to estimation from pressure only.

8 Claims, 10 Drawing Sheets

METHOD AND SYSTEM FOR CONTROLLING AIRFOIL ACTUATORS

CROSS-REFERENCE TO RELATED APPLICATIONS

The present application claims priority to U.S. Provisional Application Ser. No. 60/582,113, entitled "Using POD/mLSE algorithms to provide measurement input from surface measurements for driving actuators in active feedback flow control," filed on Jun. 23, 2004.

BACKGROUND OF THE INVENTION

1. Field of Invention

The present invention relates to airfoil actuator feedback controls and, more specifically, to the use of proper orthogonal decomposition (POD) and modified linear stochastic estimation (mLSE) for the determining the flow velocities over an airfoil and correspondingly controlling the actuators of the airfoil.

2. Description of Prior Art

The present invention is based on a foundation laid by Taylor, J. A. and Glauser, M. N., 2002, *Towards Practical Flow Sensing and Control via POD and LSE Base Low-Dimensional Tools,* 2002 ASME Fluids Engineering Division, Summer Meeting, Montreal, ASME Paper FEDSM 2002-31416, To appear, J. Fluids Eng., March 2004, hereby incorporated by reference, that demonstrates in the "ActiveWing" facility that such methods could be used for state estimation from wall pressure alone. The background of the present invention is also premised on Glauser, M., Young, M., Higuchi, H., Tinney, C. and Carlson, 2004, *H. POD Based Experimental Flow Control on a NACA*-4412 *Airfoil (Invited),* 42nd AIAA Aerospace Sciences Meeting and Exhibit—AIAA 2004-0575, hereby incorporated by reference.

The ActiveWing facility consists of a backward ramp and a variable geometry flap mounted above the ramp. The adverse pressure gradient can be altered by varying the position of the flap. As the flap angle is raised from a position parallel to the ramp to fully raised, the flow transitions from a channel flow, through a point of incipient separation, and finally to a separated flow. The ActiveWing flow study was performed to investigate the benefits of developing low-dimensional descriptions using a general basis set which includes information from all flow states, as opposed to a basis set optimized for a particular flap angle. Taylor and Glauser found that a 5 mode POD model predicts incipient separation effectively. In addition a 5 mode POD/mLSE model for the system state estimate (from wall pressure alone) captures the general features of the velocity field/POD expansion coefficients, which is key for implementation of closed-loop control. While the ActiveWing facility is essentially an internal flow, the present invention encompasses methods that are applicable to the external flow over the NACA 4412 airfoil.

Siegel, S., Cohen, K. and McLaughlin, T., 2003, *Feedback Control of a Circular Cylinder Wake in Experiment and Simulation (Invited),* 33rd AIAA Fluid Dynamics Conference and Exhibit—AIAA 2003-3569, hereby incorporated by reference, demonstrated POD based feedback control for the external flow over a circular cylinder wake with excellent results indicating that such methods indeed work for external flows as well. This report, however, used inflow measurements and not the practical surface measurements of the present invention. The recent applications of POD/mLSE by Schmit, R. and Glauser, M., 2003, *Low Dimensional Tools for Flow-Structure Interaction Problems: Application to Micro Air Vehicles,* 41st AIAA Aerospace Sciences Meeting and Exhibit—AIAA 2003-0626, and Schmit, R. and Glauser, M., 2004, *Improvements in Low Dimensional Tools for Flow-Structure Interaction Problems: Using Global POD,* 42nd AIAA Aerospace Sciences Meeting and Exhibit—AIAA 2004-0889, hereby incorporated by reference, to a Micro Air Vehicle wing wake flow demonstrate the utility of using the mLSE method for external flows as well. These trials were able to estimate with reasonable fidelity the velocity field in the wake just from dynamic strain gages mounted on the flexible wing structure.

Glauser, M, Young, M, Higuchi, H., Tinney, C. and Carlson, *H.POD Based Experimental Flow Control on a NACA*-4412 *Airfoil (Invited),* 42nd AIAA Aerospace Sciences Meeting and Exhibit—AIAA 2004-0575, hereby incorporated by reference, showed that an estimation method works well for the NACA 4412 foil, and thus provide a key foundation for the present invention.

In 1967, Lumley, J. L., *The structure of inhomogeneous turbulent flows,* Atm. Turb. and Radio Wave Prop., Nauka, Moscow and Toulouse, France, Yaglom and Tatarsky eds., pp. 166-178 (1967), hereby incorporated by reference, proposed POD as an unbiased technique for studying coherent structures in turbulent flows. POD is a logical way to build basis functions which emphasize the energetic features of the flow (Holmes, P. J., Lumley, J. L., Berkooz, G., Mattingly, J. C. & Wittenberg, R. W., *Low-Dimensional Models of Coherent Structures in Turbulence,* Physics Reports, v. 287, pp. 337-384 (1997), hereby incorporated by reference). This results in a small number of the structures containing a large percentage of the system dynamics.

POD is a straightforward mathematical approach based on the Karhunen-Loeve expansion. It is used to decompose the velocity field 1 of 9 into a finite number of empirical functions, which can be used to ascertain a subspace where a model can be constructed by projecting the governing equations on it (Holmes, P. J., Lumley, J. L. & Berkooz, G., *Turbulence, Coherent Structures, Dynamical Systems and Symmetry,* Cambridge University Press (1996), hereby incorporated by reference). These functions, $\phi$, are linearly independent and form a basis set chosen to maximize the mean square projection of the velocity field. The eigenfunctions are obtained from the following integral eigenvalue problem:

$$\int R_{ij}(\vec{x},\vec{x}\,')\phi_j^{(n)}(\vec{x}\,')d\vec{x}\,'=\lambda^{(n)}\phi_0(\vec{x}). \tag{1}$$

The kernel of equation 1 is the ensemble averaged two-point spatial velocity correlation tensor, $R_{ij}(\vec{x}, \vec{x}\,')$, which is defined as $$R_{ij}(\vec{x},\vec{x}\,')=\overline{u_i(\vec{x},t_o)u_j(\vec{x}\,',t_o)} \tag{2}$$

where to is a given time snapshot. The eigenfunctions of equation (1) give the optimal basis, and are termed empirical eigenfunctions since they are derived from the ensemble of the observations. The Hilbert-Schmidt theory ensures that if the random field occurs over a finite domain, an infinite number of orthonormal solutions can be used to express the original random velocity field, ui, $$u_i(\vec{x}, t) = \sum_{n=1}^{\infty} a_n(t)\phi_i^{(n)}(\vec{x}) \tag{3}$$

where the coefficients are defined as, $$a_n(t)=\int_D u_i(\vec{x},t)\phi_i^{(n)}(\vec{x})d\vec{x} \tag{4}$$

In 1977, Adrian, R. j., *On the role of conditional average in turbulence theory*, Turbulence in Liquids: Proceedings of the Fourth Biennial Symposium on Turbulence in Liquids, Science Press, Zakin, J. & Patterson, G., eds., pp. 323-332 (1977), hereby incorporated by reference, proposed the application of stochastic estimation to instantaneous data. Adrian recognized that the statistical information contained within the two-point correlation tensor, $R_{i}j$, could be combined with instantaneous information to form a technique for estimating the flow field. Cole, D. R., Glauser, M. N. & Guezennec, Y. G., *An Application of Stochastic Estimation to the Jet Mixing*, Layer. Phys. Fluids, 4(1), pp. 192-194 (1991), hereby incorporated by reference, demonstrated this in the axisymmetric jet shear layer where they successfully estimated the velocity radially across the jet shear layer using information from only a few radial locations. Bonnet, J. P., Cole, D. R., Delville, J., Glauser, M. N. & Ukeiley, L. S., *Stochastic estimation and proper orthogonal decomposition: Complementary techniques for identifying structure*, Experiments in Fluids. 17 pp. 307-314 (1994), hereby incorporated by reference, expanded on the work of Adrian (1977) and Cole et al. (1991) to form the complementary technique which combines the POD and LSE to obtain the time dependent POD expansion coefficients from instantaneous velocity data on course hot wire grids.

Taylor and Glauser (2002, 2004) further expanded these methods and demonstrated how instantaneous wall pressure measurements could be used to construct an accurate representation of the instantaneous velocity field from wall pressure alone (i.e., the modified complementary technique or modified linear stochastic estimation (mLSE)). This approach can be applied to the POD using either the "conditional" or "global" POD eigenfunctions described above. Boree, J., *Extended proper orthogonal decomposition: A tool to analyze correlated events in turbulent flows*, Experiments in Fluids 35, pp. 188-192 (2003) and Fogleman, M., Lumley, J. L., Rempfer, D. and Haworth, D., *Analysis of tumble breakdown in ic engine flows*, To appear Physics of Fluids (2004), hereby incorporated by reference, apply a similar approach to engine cylinder flow, but the approach has not been used to determine the flow velocity over an airfoil, nor has it been used to control airfoil actuators.

3. Objects and Advantages

It is a principal object and advantage of the present invention to provide a method for using Proper Orthogonal Decomposition and Modified Linear Stochastic Estimation to determine the flow velocity over an airfoil.

It is an additional object and advantage of the present invention to provide a method for feedback control over airfoil actuator using Proper Orthogonal Decomposition and Modified Linear Stochastic Estimation to determine the flow velocity and a feedback loop.

Other objects and advantages of the present invention will in part be obvious, and in part appear hereinafter.

SUMMARY OF THE INVENTION

By using a combination of Particle Image Velocimetry PIV and multiple surface pressure measurements, processed through a POD/mLSE algorithm, estimates of the velocity field from wall pressure alone are extracted. From such estimates knowledge of the state of the flow above the airfoil can be obtained (i.e., attached, fully separated or incipiently separated). Integral to the POD/mLSE algorithm is the estimation of the global POD coefficients. The utility of these time dependent coefficients, which are estimated from surface pressure only, are demonstrated in a simple proportional feedback loop (as the time series to drive the actuators) to keep the flow attached. This methodology of the present invention is critical for implementation of realistic feedback flow control since surface measurements and not inflow measurements are required for practical applications. The methodology of the present invention also works well in connection with dynamic strain on flexible bodies, so the approach is not limited to estimation from pressure only.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
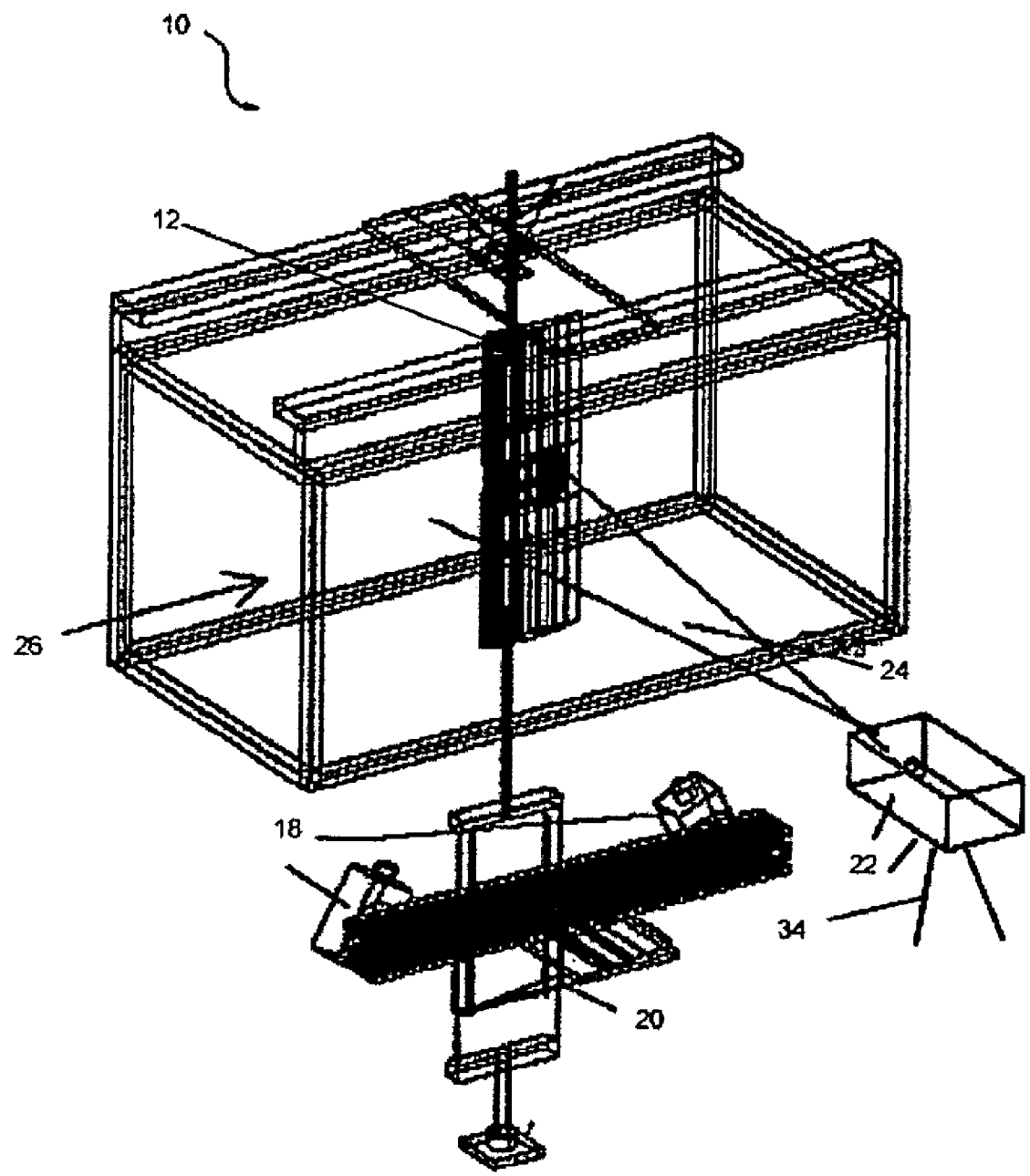
FIG. 1 is a schematic view of a low speed wind tunnel test according to the present invention.

The present invention uses the mLSE method to compute the POD velocity coefficients above the airfoil using discrete pressure measurements taken on the airfoil surface, i. e., the conditional structure is the random POD coefficient, $a_n(t)$ and the conditions are the wall pressure. The present invention uses the time dependent information provided by equation (3) of the POD to develop the low-dimensional descriptions of the flow. It is essential to have knowledge of the flow field at all points in space simultaneously so that the required projection can be executed to obtain the time dependent expansion coefficients from the POD. Through the POD method, most of the flow's kinetic energy can be captured in a small number of modes, enabling accurate characterization of the physics in a low-dimensional model.

The POD method is applied to the flow in two distinct ways. First, POD is used to solve each flow state (angle of attack) separately. The kernel that is used to solve equation 1 of the POD is:

$$R_{ij}(\vec{x},\vec{x}',t_o,\alpha)=\langle u_i(\vec{x},t_o,\alpha)u_j(\vec{x}',t_o,\alpha)\rangle. \quad (5)$$

This can be thought of as a conditional (at a given angle of attack, Reynolds number) application of the POD. The second approach to the problem is to average over the individual flow states. This method uses a kernel of the form:

$$R_{ij}(\vec{x},\vec{x}',t_o)=\langle u_i(\vec{x},t_o)u_j(\vec{x}',t_o)\rangle. \quad (6)$$

The advantage to this method is that the eigenfunctions obtained are richer in the sense that that know about multiple states of the flow, which, for example may include flow states at different angles of attack, different Reynolds numbers and with/without control inputs. This approach has been termed the global POD. Substituting either the conditional or global kernel into equation (1) provides the desired basis functions.

Since both the fluctuating pressure and the random POD coefficients are integrated quantities, the correlation between them is strong and the method makes sense from a physical standpoint. The instantaneous wall pressure is used in equation (7), shown below, to obtain $\tilde{a}_n$ the estimate of the random POD coefficient that describes the velocity field over $\vec{x}$ given the instantaneous surface pressures, $p_i(t)$.:

$$\tilde{a}_n(t)=\langle a_n(t)|p(t)\rangle \quad (7)$$

The estimated random coefficients for each POD mode can be described as a series expansion using the instantaneous surface pressures available at i positions on the airfoil surface:

$$\tilde{a}_n(t)=B_{n1}p_1(t)+B_{n2}p_2(t)+\ldots+B_{nq}p_q(t). \quad (8)$$

Truncating this expression to include only the linear term (plus the error associated with neglecting the higher order terms) results in:

$$\tilde{a}_n(t)=B_{ni}p_i(t)+O[p_i^2(t)]. \quad (9)$$

The coefficients are considered to be the conditional structures of the flow, and they effectively describe a certain percentage of the energy contained in a certain spatial POD mode. The elements of $B_{ni}$ are chosen to minimize the mean square error, $$e_{\tilde{a}_n}=\overline{[\tilde{a}_n(t)-a_n(t)]^2}$$

by requiring that $$\frac{\partial \varepsilon_{\tilde{a}_n}}{\partial B_{ni}}=\frac{\partial \overline{[B_{ni}p_i(t)-a_n(t)]^2}}{\partial B_{ni}}$$
$$=0$$

The solution to the minimization problem of equation (9) is a linear system of equations, which can be written in matrix form as:

$$\begin{bmatrix} \langle p_1^2 \rangle & \langle p_1 p_2 \rangle & \cdots & \langle p_1 p_q \rangle \\ \langle p_2 p_1 \rangle & \langle p_2^2 \rangle & \cdots & \langle p_2 p_q \rangle \\ \vdots & \vdots & \ddots & \vdots \\ \langle p_q p_1 \rangle & \langle p_q p_2 \rangle & \cdots & \langle p_q^2 \rangle \end{bmatrix} \begin{bmatrix} B_{n1} \\ B_{n2} \\ \vdots \\ B_{nq} \end{bmatrix} = \begin{bmatrix} \langle a_n p_1 \rangle \\ \langle a_n p_2 \rangle \\ \vdots \\ \langle a_n p_q \rangle \end{bmatrix}$$

The elements $B_{ni}$ are then substituted into equation (9) to estimate the random POD coefficient for each instantaneous pressure measurement. These coefficients when combined with the POD eigenfunctions provide an estimate of the instantaneous velocity field, $u_i$ from application of equation 3.

For flow control studies, the present invention uses the mLSE method to provide the state of the flow from wall pressure only. This provides one method for monitoring the system state with physically realizable input from practical wall sensors. The estimated coefficients obtained from equation (9) may then be used as a time series to drive airfoil actuators via a simple proportional feedback loop.

EXAMPLE

The present invention was tested in the subsonic wind tunnel facility at Syracuse University, which consists of a Gottingen-type, closed, recirculating design with the flow loop arranged in a horizontal configuration. The test section, 24 in (w)×24 in (h)×96 in (1), was made of optical plexiglass panels and is illustrated with the full experimental test section 10 in FIG. 1. The speed in test section 10 is continuously variable from less than 10 ft/s to greater than 230 ft/s.

A NACA 4412 airfoil 12 with an 8 inch chord was selected for the experiments. The test model was designed to meet several requirements. It had two-dimensional with a constant chord length and included an airfoil section geometry along the span. The model size was chosen to avoid significant blockage in the 2 ft.×2 ft. wind tunnel test section. Actuator sections 14 and pressure transducers 16 were configured in a modular fashion to enable rearrangement when required. Three-dimensional effects from tip vortices and the tunnel walls are reduced to a negligible level by locating the measurement window far enough from the ends of airfoil 12 and wall of test section 10. The wing span was 2 ft., thus covering the entire width of the test section 10. Pressure and PIV measurements were taken at a mid-span plane where the flow is assumed to be two dimensional.

Results were obtained at a free-stream velocity of 40 ft/s, corresponding to a Reynolds number of 170,000, based on chord length. Measurements were obtained at four angles of attack: 13°; 14°; 15° and 16° which corresponds to a fully attached (13° & 14°), incipiently separated (15°) and fully separated flow state (16°). For each angle of attack, 840 statistically independent samples 3 of 9 were obtained. Each sample included a measurement of all three components of velocity using a DANTEC FLOWMAP Stereo PIV System setup to capture data in an x-y (streamwise-spanwise) plane above airfoil 12. Concurrently, the dynamic pressure was measured at eleven locations along the chord.

The output signals of pressure transducers 16 were sampled at a rate of 4 kHz using a NATIONAL INSTRUMENTS PXI-based 800 MHz signal conditioner with dedicated 24 bit high-resolution A/D converters and anti-aliasing filter. The PXI A/D system has an internal trigger for simultaneous sampling between channels, ensuring that all the pressure measurements acquired are synchronized. It also has an external trigger to temporally link pressure measurements and PIV velocity measurements. With each laser pulse, corresponding to one snapshot of the flow, a signal is sent from the PIV processing unit to the PXI and a marker is inserted in the continuous stream of pressure data. The phase-aligned information (velocity field and pressure at the surface of the wing) is input to the POD/mLSE algorithms. The PIV system is composed of two CCD cameras 18 (1280×1024 pixels) and an associated mount 20, a pair of pulsed NEWWAVE RESEARCH 200 mJ Nd:YAG lasers 22, a laser sheet 24, and a post-processing unit (not shown). A TSI olive oil based seeder (not shown) was used to produce spherical liquid particles with diameters between 1 and 51 μm, which would follow the fluctuations in the flow. The seeding was introduced directly downstream of airfoil 12 and was allowed to circulate through test section 10 before measurements began.

Laser sheet 24 lit a plane in the flow 26 through test section 10, and cameras 18 photograph the illuminated particles from two different angles. The post processing unit combines the 2D information from the snapshots and extracted the three components of velocity in the plane. From two successive measurements, the displacement of the particles was calculated, and the velocity was computed using the elapsed time between the two snapshots.

Figure 2:
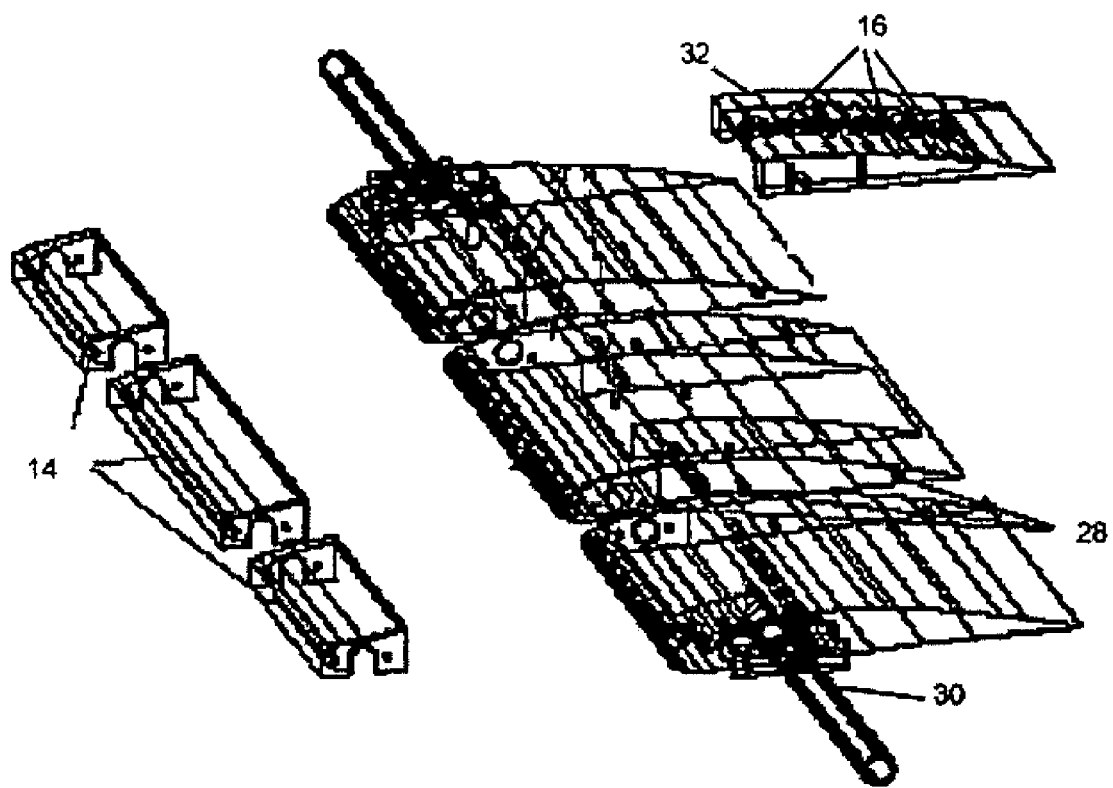
FIG. 2 is an exploded view of a NACA 4412 Airfoil.
Figure 3:
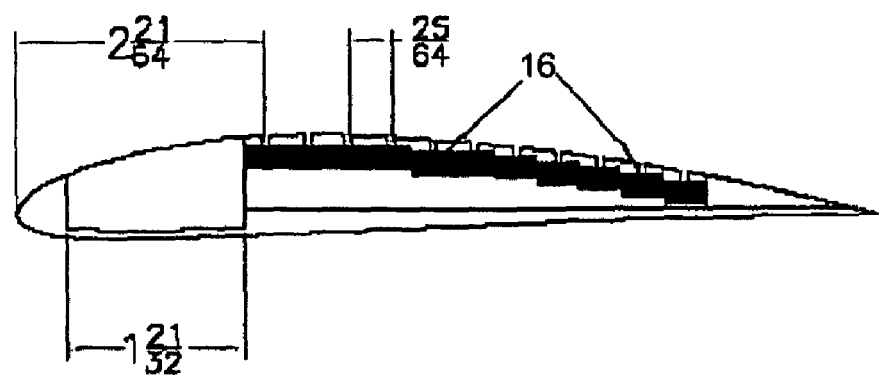
FIG. 3 is a side and a top view of a NACA 4412 Airfoil.
Figure 3:
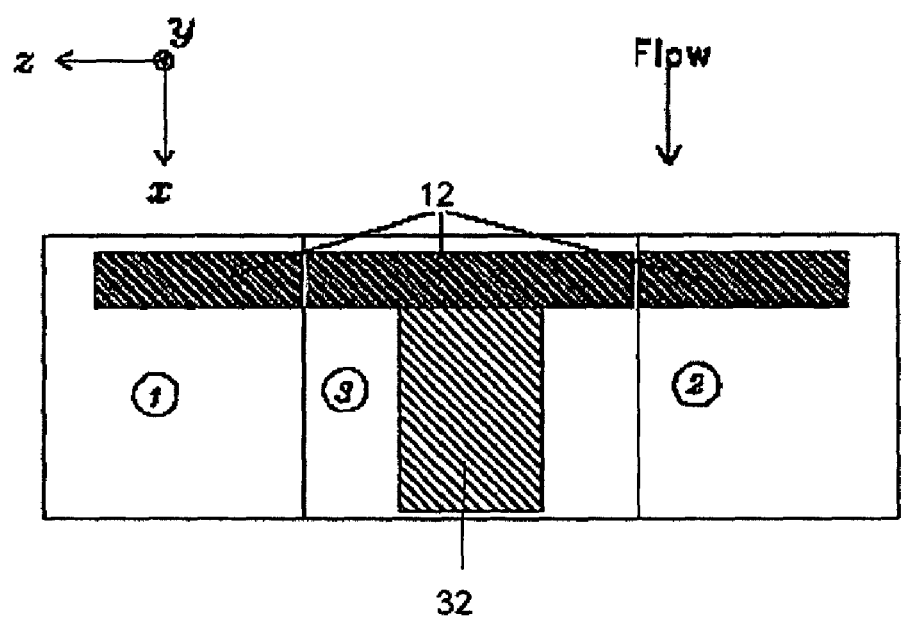

Given the thickness distribution of airfoil 12, the most accessible location for actuators sections 14 were in the first 10 to 30 percent of the chord. This is a good choice of location for actuation based on the boundary layer location as well. The wing was machined from aluminum and divided along the span into three sections, a center section of 9 in. sandwiched between two 7.5 in. outer sections. These three main pieces are held in position with pins 28 and fastened together by a threaded rod 30, as shown in FIG. 2. The angle of attack must be continuously variable, covering a range from attached to separated flow. Therefore, airfoil 12 was hinged on the sides of test section 10 using a hollow tube as an exit guide for the wires and tubing. Each of the two outer sections contained a 5.6 in. long modular segment that housed three actuators 14. The center section was comprised of a similar segment that is 8.75 in. long, in addition to a 5 in. wide segment for the dynamic pressure transducers and static pressure ports. FIG. 3 illustrates a top view of airfoil 12.

A pressure sensor insert section 32 contained eleven dynamic pressure transducers 16 with accompanying static pressure manifolds, distributed at equidistant locations along the chord. The eleven dynamic pressure transducers 16 were spaced evenly from $x/c=0:29$ to $x/c=0:78$ with a $\delta x/c$ spacing between each transducer 16 of 0.049. This leaves the remaining space for actuator insert sections 14 (see FIG. 3). Pressure transducers 16 embedded in the wing measure the fluctuating surface pressure on the model, providing data for the system state estimate via POD/mLSE. Transducers 16 were ICP pressure sensors from PCB Piezotronics. They have a 2 psig measurement range, a 0.02 mpsig resolution, 4 of 9 and a bandwidth of 5 Hz-13 kHz. The sensors are miniature air turbulence sensors (0.375 in. diameter, 0.22 in. height) and were chosen because of their response characteristics. Due to space constraints in the airfoil, the small size was necessary.

The control input consisted of eleven small oscillatory jets near the leading edge of the airfoil, produced by vibrating speakers on the surface. To avoid three dimensional effects, actuator output should be invariant in the spanwise direction. This is achieved with a small 1/32 in. wide slot in the actuator section 14 for the airfoil. The speakers chosen are ICC FNT-ERVOX shielded low leakage speakers. The selected speakers are 1.12×1.57 in, with depth of 0.44 in and rated power is 1.0/2.0 W (Nom/Max). These speakers have the advantage of covering a wide range of frequencies (250 200 kHz) while maintaining a significant velocity at the exit of the slot.

Figure 4:
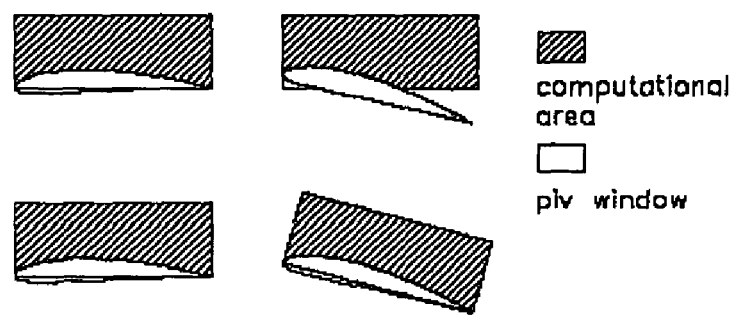
FIG. 4 is a schematic illustrating movement of the PIV window.
Figure 5:
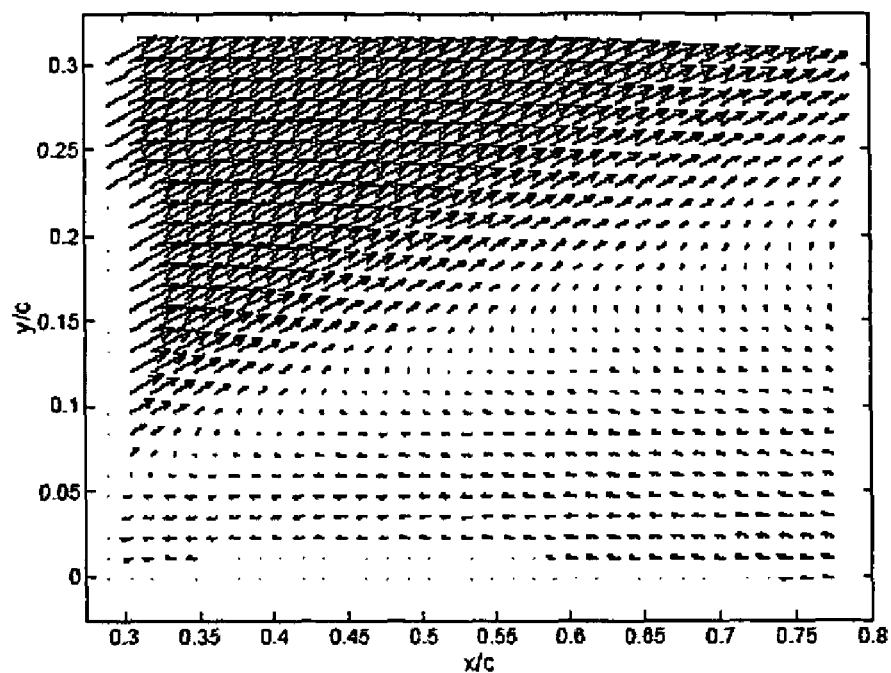
FIG. 5 is a profile of the mean velocities at a 16° angle of attack, N=840.
Figure 6:
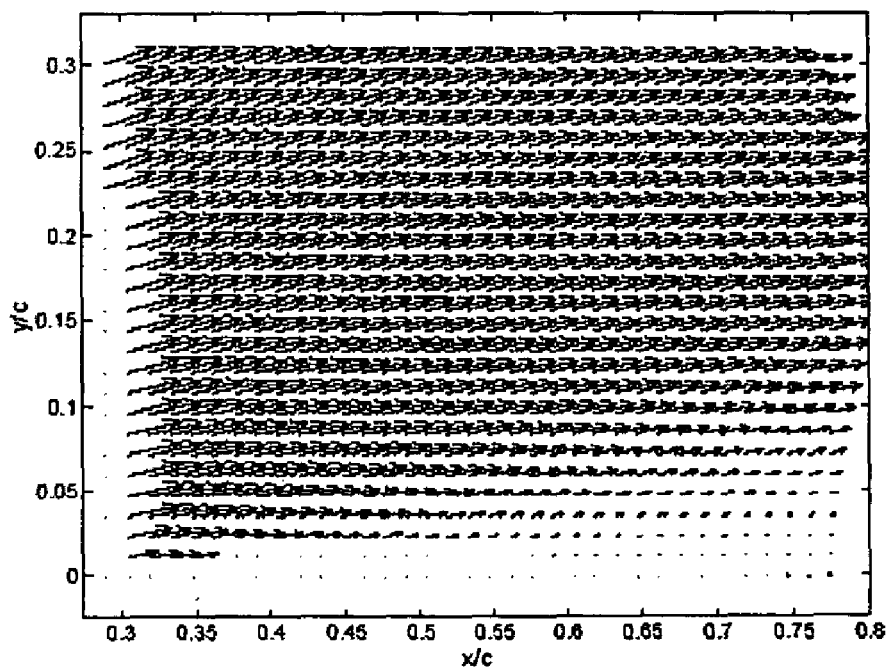
FIG. 6 is a profile of the mean velocities at a 15° angle of attack, N=840.
Figure 7:
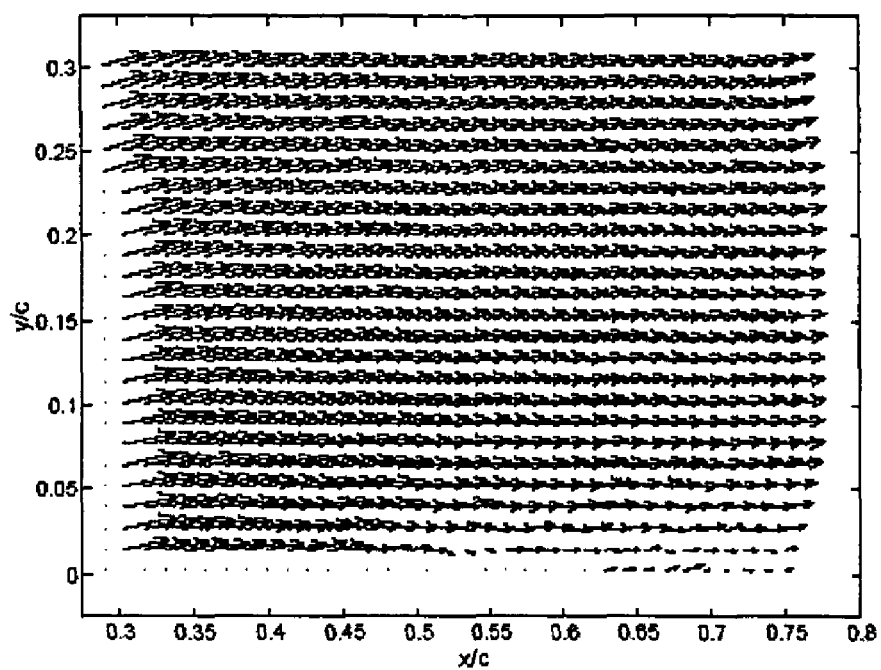
FIG. 7 is a profile of the mean velocities at a 14° angle of attack, N=840.
Figure 8:
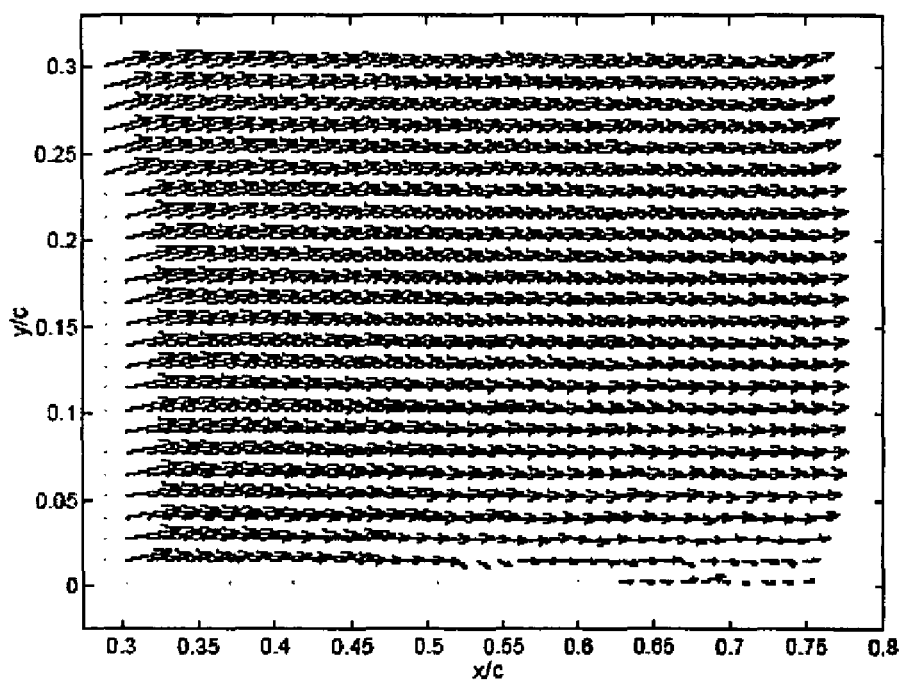
FIG. 8 is a profile of the mean velocities at a 13° angle of attack, N=840.

The full setup of the system was designed to allow for future experiments where airfoil 12 will pitch dynamically. In determining feasible options, much consideration was taken in deciding how to keep cameras 18 in line with airfoil 12 at all times. Since the area of focus of cameras 18 correspond to the computational domain used for POD/mLSE computations, the camera domain was fixed in the airfoil coordinate so that cameras 18 followed the movement of airfoil 12 (FIG. 4). Camera mount 20 was linked to the hinge of airfoil 12, to allow airfoil 12 and cameras 18 to rotate in unison about the same axis. Laser 22 was fixed in space and positioned on a tripod 34 in front of test section 10, as shown in FIG. 1.

FIGS. 5, 6, 7 and 8 present the mean velocities at $\alpha=16°$; 15°; 14° and 13°, respectively, of the u and v components of the velocity field. These profiles have been created from an ensemble average of 840 stereo PIV vector measurements. From these figures, it is clear that the flow is attached for $\alpha=13°$ and 14°, incipient for $\alpha=15°$ and fully separated for $\alpha=16°$.

Figure 9:
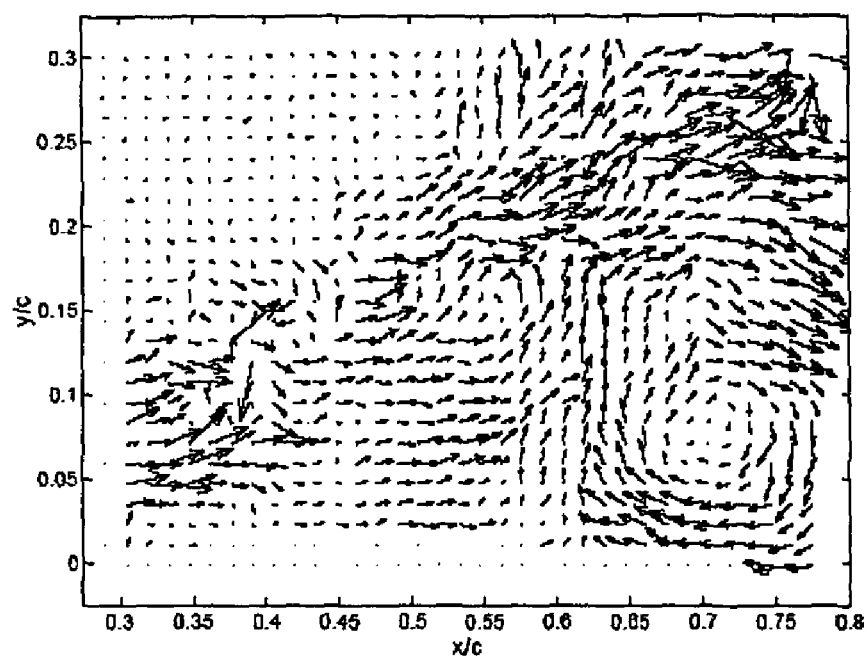
FIG. 9 is a time snap shot of the u and v components of the fluctuating velocity field at a 16° angle of attack.
Figure 10:
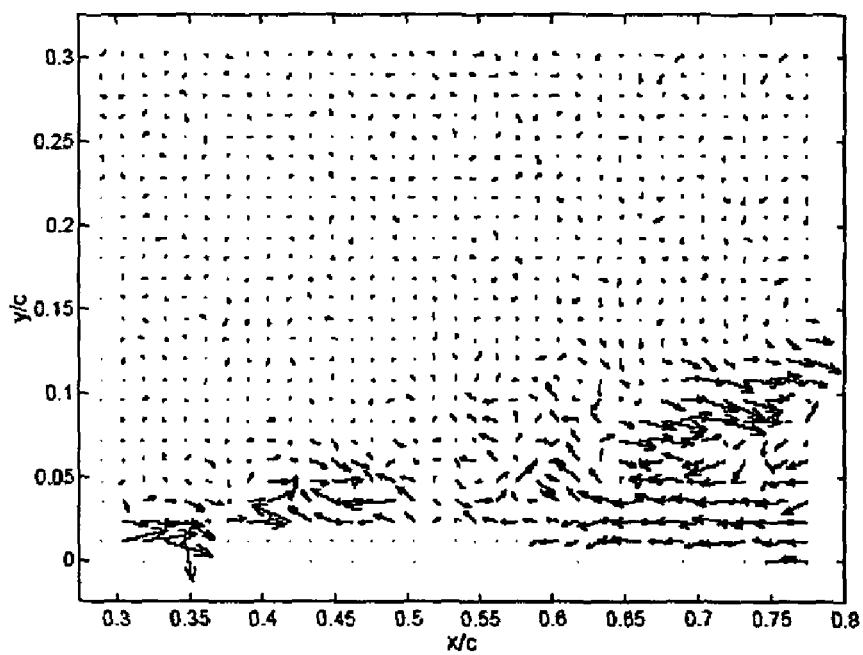
FIG. 10 is a time snap shot of the u and v components of the fluctuating velocity field at a 15° angle of attack.
Figure 11:
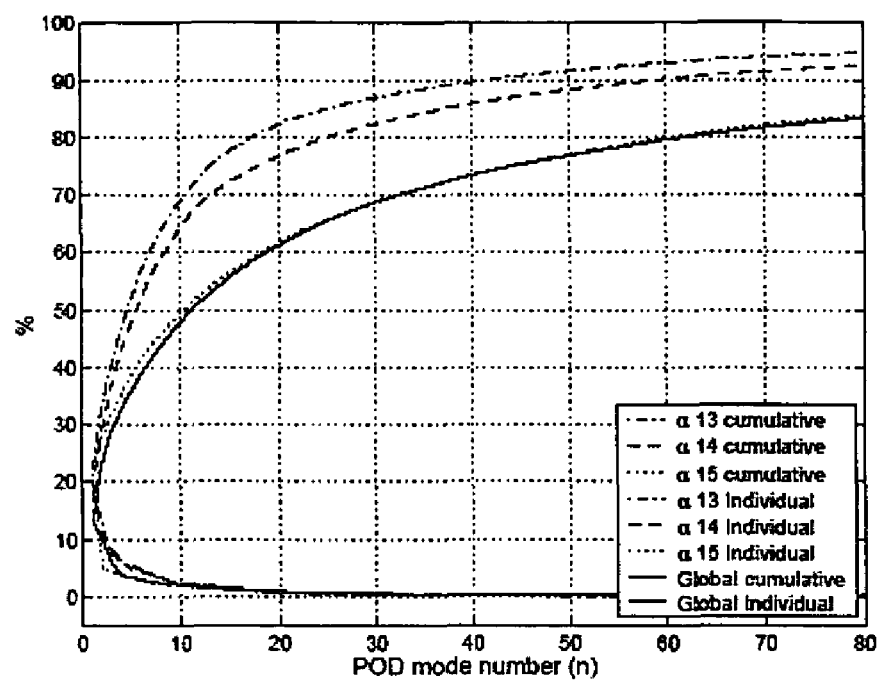
FIG. 11 is a graph of the convergence of POD eigenvalues for both conditional and global POD.

FIGS. 9 and 10 are instantaneous snap shots at $\alpha=16°$ and 15°, respectively, of the fluctuating u and v components of the velocity field. The $\alpha=15°$ snapshot is rebuilt using both the conditional and global POD to get a sense of the low dimensionality of the flow. The mLSE is used to demonstrate the ability of the present invention to reconstruct the flow in the incipient state from airfoil surface pressure. Applications of conditional and global POD FIG. 11 shows the convergence of the POD eigenvalues from application of both the conditional POD for angles $\alpha=15°$; 14° and 13° as well as the global POD which include knowledge of all 3 angles. $\alpha=16°$ is not included since it is desirable to utilize feedback control before the flow reaches the fully separated state. Only the fluctuating u and v components of the velocity in the tensor are used.

The plots on the upper portion of the graph are the cumulative sum of the eigenvalues and those on the lower part are the individual contributions of the eigenvalues to the total energy, both relative to the total energy. Note that the conditional POD applications converge slightly more rapidly than the global for all conditions, however the global are a richer set of eigenfunctions and can be used for all 3 angles.

Figure 12:
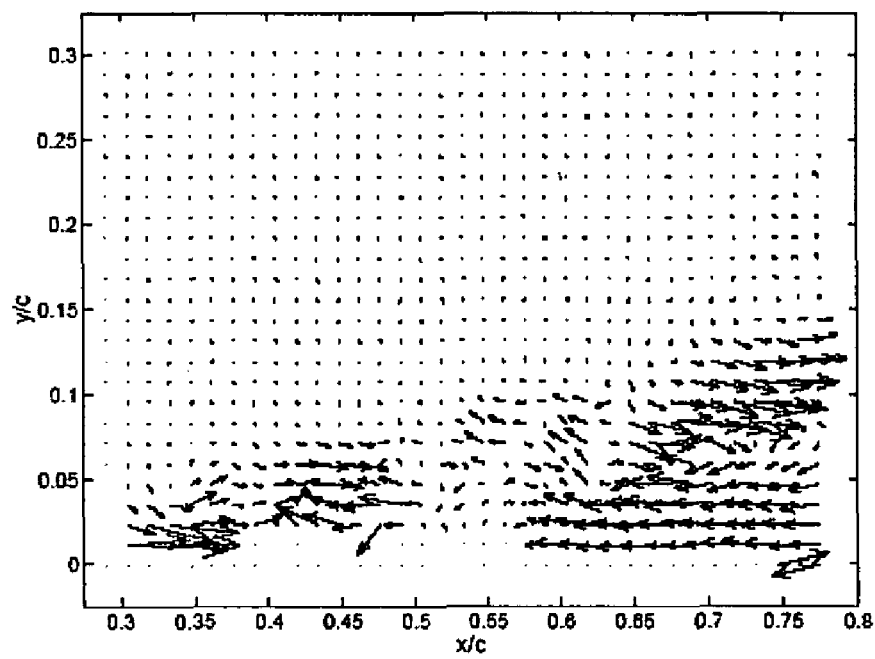
FIG. 12 is a graph of a reconstruction using 50 conditional POD modes for the fluctuating velocity snapshot at a 15° angle of attack.
Figure 13:
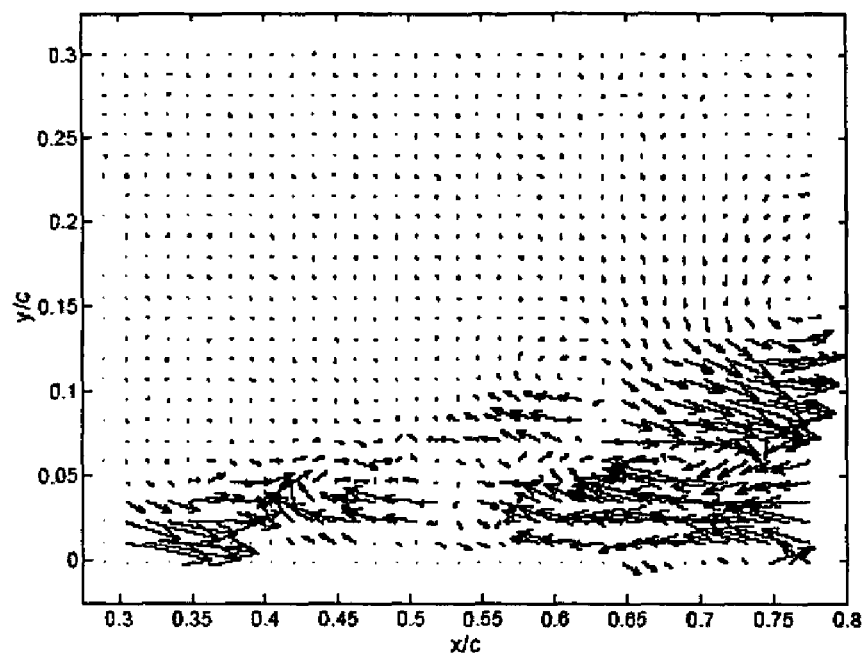
FIG. 13 is a graph of a reconstruction using 50 global POD modes for the fluctuating velocity snapshot at a 15° angle of attack.

FIG. 12 shows a 50 POD mode reconstruction of the snapshot shown in FIG. 10 (the incipient condition) using the conditional POD. A 50 mode reconstruction (out of a total of 1820 POD modes) provides a nice representation of the actual snapshot indicating that the flow is low-dimensional. FIG. 13 shows a 50 POD mode reconstruction of the snapshot shown in FIG. 10 using the global POD. One can see that fifty global POD modes provides a nice representation of the actual snapshot. This result is also quite similar to that from the conditional application shown in FIG. 12.

From these results we conclude that this flow is low dimensional and that the global POD modes provide a suitable basis which can be used for all 3 angles of attack. These global POD eigenfunctions are next used in the mLSE method.

Figure 14:
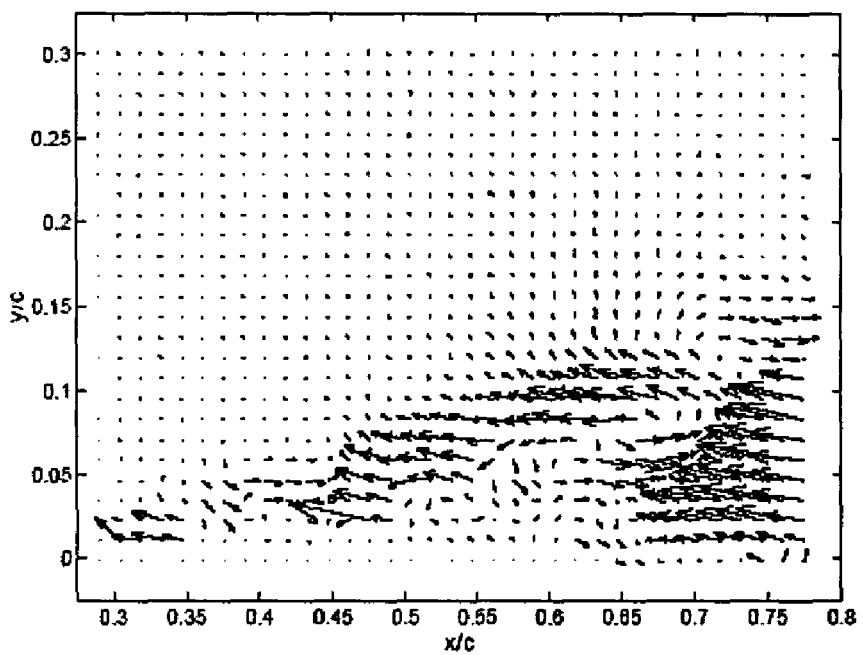
FIG. 14 is a graph of a reconstruction using 50 global POD modes with the mLSE method for the fluctuating velocity snapshot at a 15° angle of attack.

FIG. 14 shows a 50 POD mode reconstruction of the snapshot shown in FIG. 10 using the global POD with the mLSE method which uses airfoil surface pressure only. The general features of the snapshot are captured with this estimate. This is consistent with the results of Taylor and Glauser (2002, 2004), who demonstrated in the ActiveWing facility that such methods could be used for state estimation from wall pressure alone (airfoil surface pressure for the NACA 4412).

As seen above, the mLSE method provides a reasonable estimate of the velocity field above the airfoil. The next step is to close the feedback loop using these low dimensional estimates based on the global POD eigenfunctions. As a first step, the POD coefficients obtained from equation 9 are used as a time series to drive actuator sections 12 via a simple proportional feedback loop. Estimates of these coefficients are obtained from the time dependent airfoil surface pressure only, processed through the POD/mLSE algorithm. Thus, an error is defined between the estimated time dependent global POD coefficients at the incipient condition (15°), and the RMS of these coefficients at the fully attached condition (13°): the desired state. This can be written as $$\epsilon(t) = a^{(n)}(t)_{15} - RMS(a^{(n)}(t)_{13})$$

Actuators 16 will then be driven according to:

$$Act_{input} = A\epsilon(t)\sin(2\pi f_o t) \quad (10)$$

where the amplitude A can be selected based on open loop results. The time series from the estimated global POD coefficients are thus being used to amplitude modulate, since actuators 14 are driven continuously at a value of $f_o$, which is selected based on the optimal operating characteristics of actuators 14. The speakers are best operated at frequencies above 200 Hz but typical flow separation events are at a much lower bandwidth (20-40 Hz range) as can be seen in the surface pressure spectra shown in FIG. 15. Hence, amplitude modulation provides the necessary lower frequency flow excitation for the current experiment.

Equation 10 is written for a given POD mode n. A decision must be made as to which particular n to select in the formula $$\epsilon(t) = a^{(n)}(t)_{15} - RMS(a^{(n)}(t)_{13})$$

Figure 16:
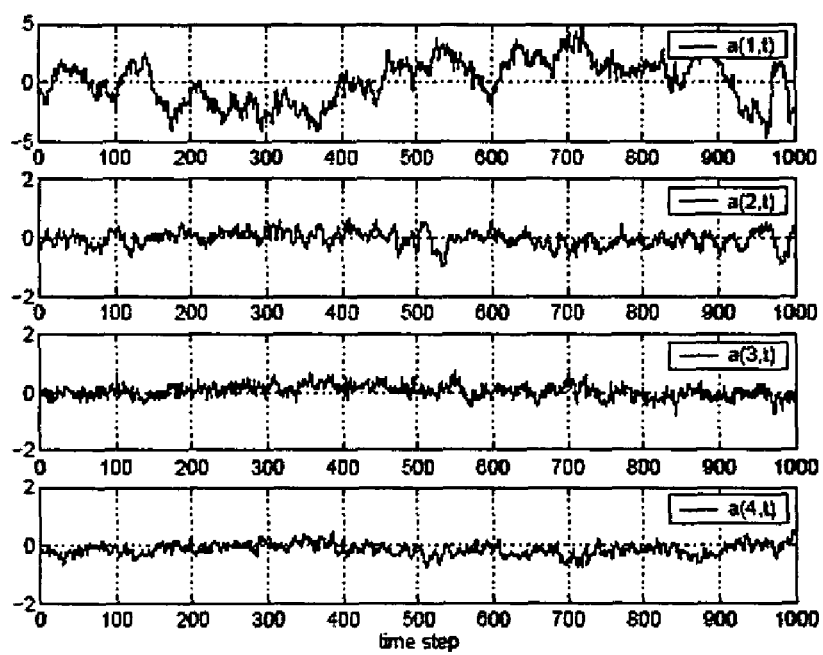
FIG. 16 is a graph of the time resolved estimates of 4 global POD coeffiecients from airfoil surface pressure, measurements at a 15° angle of attack.

FIG. 16 shows the time series for the first 4 estimated POD coefficients at the incipient condition ($\alpha=15°$). As can be seen from these time series, it appears that global POD mode 1 is the best candidate since it has the largest amplitude and the lowest frequency information. The experiments described below relate to an airfoil where feedback is applied using the results from equation 10 with n=1. The POD coefficients are estimated from surface measurements, which alone are necessary for practical feedback flow control.

Figure 17:
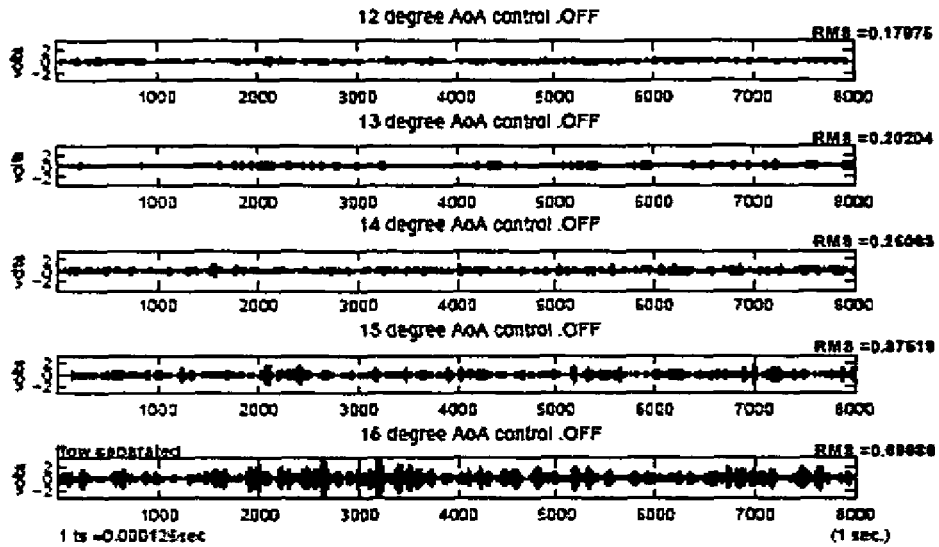
FIG. 17 is a graph of the first POD coefficient estimated from wall pressure (no control) modulating 2000 Hz wave for angle of attack from 12-15 degrees (used to drive actuators).

FIG. 17 shows the first POD coefficient estimated from surface pressure only(with no actuation), low pass filtered at 100 Hz, modulating the 2000 Hz wave (which we drive the actuators at in this case) for AoA from 12-15 degrees. FIG. 17 illustrates several key points.

First, the RMS amplitude of the estimated POD coefficients increases with the AoA, as it senses the incipient separation and the growing structures in the boundary layer. The dated is gleaned from surface pressure, a practical variable to measure, and then processed through the POD/mLSE algorithm. The growing amplitude with the angle is a necessary criteria for the control method to be possible. The control will be robust, since the separated flow at 16 degrees has a significantly larger amplitude than that at the lower angels of attack, showing the onset of separation signature. Even if the flow separates, the control will grow larger and will be able to reattach the flow.

Figure 15:
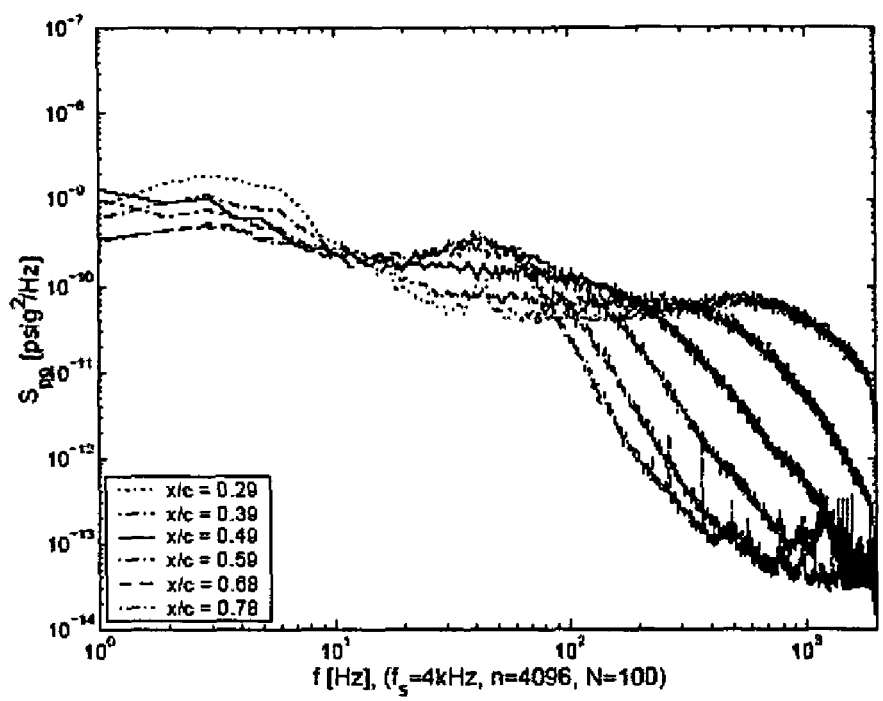
FIG. 15 is a graph of the airfoil surface pressure spectra at a 15° angle of attack.

Second, the modulation frequency estimated from the POD/mLSE method is within the proper frequency band for the boundary layer scales (compare for example to the pressure spectra shown in FIG. 15, in particular the band between 50-100 Hz).

Hence, from the estimated POD coefficient the relevant amplitude and frequency information for driving the actuators in a feedback flow control loop are being provided.

Figure 18:
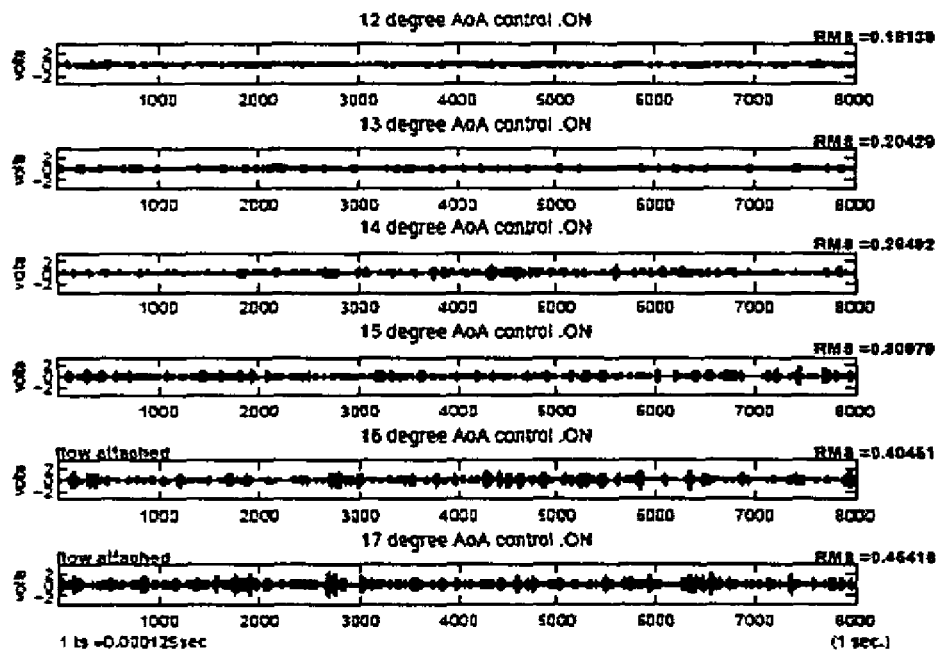
FIG. 18 is a graph of the first POD coefficient estimated from wall pressure (with control) modulating 2000 Hz wave for angle of attack from 12-15 degrees (used to drive actuators).

This information may next be utilized in a proportional feedback control loop. FIG. 18 shows the first POD coefficient estimated from wall pressure, low pass filtered at 100 Hz modulating 2000 Hz wave with the actuators on being driven by this POD coefficient. At 12, 13, 14 degree AoA, the actuation has little effect on the flow if the RMS in this Figure is compared to FIG. 17. This results stems from the fact that the amplitude is being properly tracked and, since the flow is not in the incipient condition, the amplitude is low. At 15 degrees, the actuation does decrease the amplitude of the coefficients, a necessary criteria for the control to be stable. Incipient conditions up to 17 deg AoA are maintainable (see RMS still lower than that of FIG. 16, separated as shown in FIG. 17, without optimizing the actuation and with a rather low RMS output from the speakers.

What is claimed is:

1. A method of determining the instantaneous velocity field of an airfoil, comprising the steps of:
    taking a plurality of instantaneous pressure measurements from the surface of said airfoil;
    estimating the random POD coefficients for each said instantaneous pressure measurement;
    determining the POD eigenfunctions;
    combining said random POD coefficients with said POD eigenfunctions to estimate said instantaneous velocity field over said airfoil.

2. The method of claim 1, wherein said step of estimating the random POD coefficients for each said instantaneous pressure measurement comprises the steps of:
    forming a series expansion from the instantaneous surface pressures;
    truncating said series expansion to include only a linear term;
    calculating the values for minimizing the mean square error; and
    determining said estimate of random POD coefficients by substituting said minimization value into said truncated series expansion.

3. The method of claim 1, wherein said step of determining the POD eigenfunctions comprises the steps of:
    determining the ensemble averaged two-point spatial velocity correlation tensor;
    calculating the coefficients of the orthonormal solutions expressing the original random velocity field.

4. The method of claim 1, further comprising the step of displaying a graph of said instantaneous velocity field.

5. A method of controlling the actuator of an airfoil, comprising the steps of:
    taking a plurality of instantaneous pressure measurements from the surface of said airfoil;
    estimating the random POD coefficients for each said instantaneous pressure measurement;
    determining the POD eigenfunctions;
    combining said random POD coefficients with said POD eigenfunctions to estimate said instantaneous velocity field over said airfoil,
    controlling said actuator through a proportional feedback loop based on said estimated instantaneous velocity field.

6. A system for controlling the actuator of an airfoil, comprising:
    a plurality of pressure transducers for measuring the instantaneous surface pressures of said airfoil;
    a microprocessor electrically interconnected to said transducers,
    wherein said microprocessor is programmed to digitally sample said transducers at a predetermined rate to obtain said instantaneous surface pressures; and wherein said microprocessor is programmed to estimate the instantaneous velocity field of said airfoil based on said digital sample of said instantaneous pressure measurements.

7. The system of claim 6, wherein said microprocessor implements a proportional feedback loop to control said actuator based on said instantaneous velocity field.

8. The system of claim 6, wherein said microprocessor is programmed to estimate the random POD coefficients for each said instantaneous pressure measurement, determine the POD eigenfunctions, and then combine said random POD coefficients with said POD eigenfunctions to estimate said instantaneous velocity field.

* * * * *